United States Patent [19]
Thomas

[11] Patent Number: 5,986,873
[45] Date of Patent: Nov. 16, 1999

[54] CREATING SURFACE TOPOGRAPHY ON AN ELECTROSTATIC CHUCK WITH A MANDREL

[75] Inventor: Randy Lee Thomas, Orange, Calif.

[73] Assignee: Packard Hughes Interconnect Co., Irvine, Calif.

[21] Appl. No.: 08/673,856

[22] Filed: Jul. 1, 1996

[51] Int. Cl.⁶ .................................................. H02N 13/00
[52] U.S. Cl. ........................................... 361/234; 279/128
[58] Field of Search ............................. 361/234; 279/128

[56] References Cited

U.S. PATENT DOCUMENTS

| | | | |
|---|---|---|---|
| 3,078,565 | 2/1963 | Sanders | 29/527.6 |
| 5,055,964 | 10/1991 | Logan et al. | 361/234 |
| 5,255,153 | 10/1993 | Nozawa et al. | 361/234 |
| 5,460,684 | 10/1995 | Saeki et al. | 156/345 |
| 5,484,485 | 1/1996 | Chapman | 118/723 R |
| 5,491,603 | 2/1996 | Birang et al. | 361/234 |
| 5,522,131 | 6/1996 | Steger | 29/829 |
| 5,530,616 | 6/1996 | Kitabayashi et al. | 361/234 |
| 5,583,736 | 12/1996 | Anderson et al. | 361/234 |
| 5,606,485 | 2/1997 | Shamoulian et al. | 361/234 |
| 5,631,803 | 5/1997 | Cameron et al. | 361/234 |
| 5,745,331 | 4/1998 | Shamouilian et al. | 361/234 |
| 5,753,132 | 5/1998 | Shamoulian et al. | 361/234 |

FOREIGN PATENT DOCUMENTS 60-261377  12/1985  Japan ............................. H02N 13/00

*Primary Examiner*—Fritz Fleming
*Attorney, Agent, or Firm*—Patrick M. Griffin

[57] ABSTRACT

The invention includes an electrostatic chuck having surface topography and a method of making the same including the steps of providing a first insulative layer and a conductive layer laminated thereto. The first insulative layer is secured to a pedestal. A second insulative layer is deposited over the conductive layer and the first and second insulative layer and the copper layer are laminated together by a mandrel. The mandrel has recesses formed therein to produce an electrostatic chuck having a surface topography including raised features. The mandrel may have an annular groove defined therein for producing a raised gasket defined in the second insulative layer.

5 Claims, 2 Drawing Sheets

5,986,873

CREATING SURFACE TOPOGRAPHY ON AN ELECTROSTATIC CHUCK WITH A MANDREL

FIELD OF THE INVENTION

This invention relates to electrostatic chucks, and more particularly to a chuck having surface topography.

BACKGROUND OF THE INVENTION

An electrostatic chuck holds a semiconductor wafer onto a pedestal using electrostatic attraction inside a plasma reactor chamber. In a plasma etching apparatus, wafers are cooled so as not to be damaged due to the high temperature caused by the plasma. In this regard, it is desirable to circulate a coolant between the electrostatic chuck and the wafer. Heretofore, a variety of methods have been utilized to accomplish this. In some systems, grooves are machined into a pedestal and an insulated copper foil is placed over the same to provide channels or grooves for the flow of a gas coolant which is supplied through a port formed in the pedestal. Another method involves applying an insulated conductive element on a pedestal and etching grooves in the top surface of the insulative layer to again provide coolant grooves or channels for a gas such as helium. Yet another method is to selectively apply isolated strips of an insulative material such as polyimide on a flat pedestal and overlay a conductive foil on the same to produce a surface with raised features caused by the selectively placed insulative strips. The raised features elevate the semiconductive wafer and define a pooling area for the cooling gas. These systems are expensive and complicated to assemble.

The present invention provides advantages and alternatives to the prior art.

SUMMARY OF THE INVENTION

The invention includes an electrostatic chuck having surface topography and a method of making the same including the steps of providing a first insulative layer and a conductive layer laminated thereto. The first insulative layer is secured to a pedestal. A second insulative layer is deposited over the conductive layer and the first and second insulative layer and the copper layer are laminated together by a mandrel. The mandrel has recesses formed therein to produce an electrostatic chuck having a surface topography including raised features. The mandrel may have an annular groove defined therein for producing a raised gasket defined in the second insulative layer.

These and other objects, features and advantages of the present invention will become apparent from the following brief description of the drawings, detailed description and appended claims and drawings.

DETAILED DESCRIPTION

Figure 1:
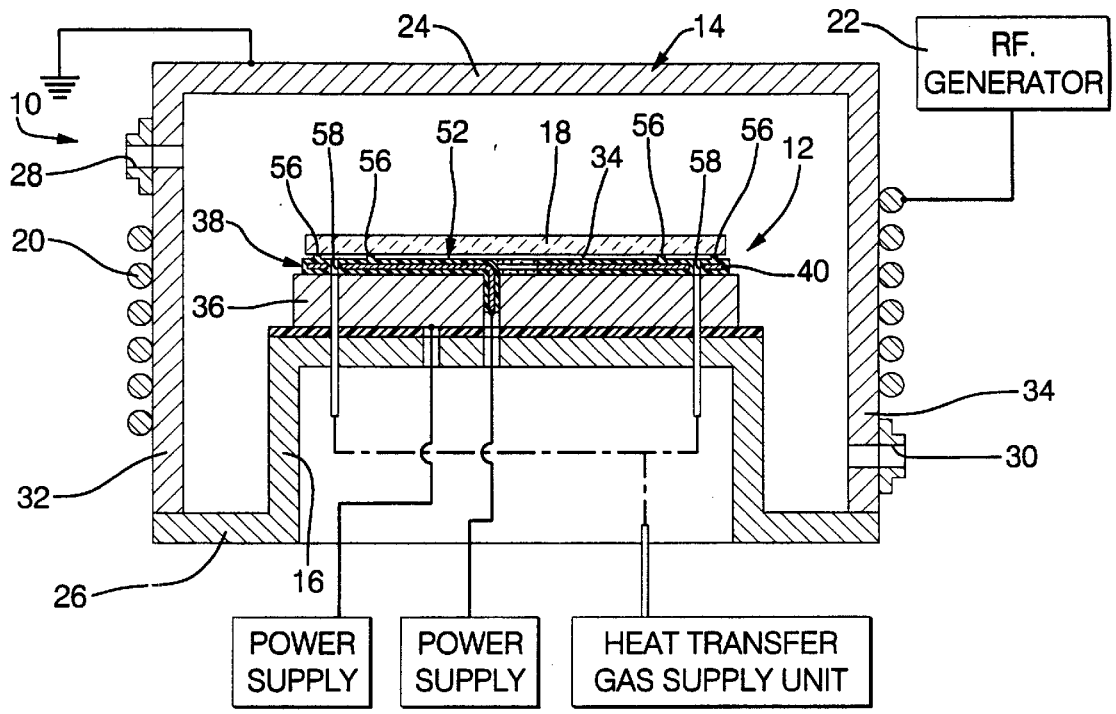
FIG. 1 is a partial sectional view of a plasma etching apparatus including an electrostatic chuck according to the present invention.

Plasma etching apparatuses are known to those skilled in the art. FIG. 1 schematically illustrates such a plasma etching apparatus 10 equipped with an electrostatic chuck 12 of the present invention. The apparatus includes a vacuum chamber 14, a pedestal 16 arranged in the chamber for supporting a silicon semiconductive wafer 18, RF coil 20 and a RF generator source 22 for generating a plasma. The vacuum chamber 14 includes an upper wall 24 and a lower wall structure 26, a gas inlet port 28 and a gas outlet port 30 located on opposed walls 32, 34 respectively and connecting to a vacuum chamber pump (not shown) to reduce the pressure in the chamber. An electrostatic chuck 12 is placed on the pedestal 16 for holding a wafer 18. The electrostatic chuck 12 includes a main body 36 serving as a lower electrode and connected to a power supply. The upper wall 24 of the chamber serves as an upper electrode and is tied to ground. Thus, the electrodes are aligned to form plane parallel electrodes. An upper portion 38 of the electrostatic chuck includes a conductor such as a copper film covered top and bottom by an insulating film such as polyimide. The upper portion 38 of the electrostatic chuck is also connected to a power supply for electrostatically holding the wafer 18 onto the electrostatic chuck. A heat transfer gas supply port is provided through both the main body portion and the upper portion of the electrostatic chuck. Heat transfer gas such as oxygen, nitrogen or an inert gas such as helium or argon is supplied to cool the underside of the semiconductor wafer.

An electrostatic chuck may be constructed as follows. A first insulative layer 42 is placed on a substrate 37 for processing. A conductive layer 40 such as a copper foil having a thickness of about 1 micron to 0.0014 inches is provided. The copper foil 40 may have preformed holes 41 formed therein through which coiling gases may flow during operation of the chuck. The copper foil 40 is laminated to the first insulative layer 42 such as polyimide. A second insulative layer 44 which may be polyimide is placed over the conductive layer 40. Preferably, each insulative layer 42, 44 has a thickness of about 0.0005 to 0.002 inches. A mandrel 46 is provided having grooves 48 machined in a lower surface 50 thereof and constructed and arranged as a reverse image of the features to be produced on the second insulative layer 44. The first and second insulative layers 42, 44 and the conductive layer 40 are laminated together by forcing the mandrel 46 against the second insulative layer 44 at a pressure of about 275 psi, for a period of about 90 minutes at a temperature of about 380° F. The mandrel is removed to produce the upper portion 38 of electrostatic chuck 12 with a conductive layer 40 encapsulated by an insulator 52 having raised features 56 extending upward from a top surface 54.

Figure 3:
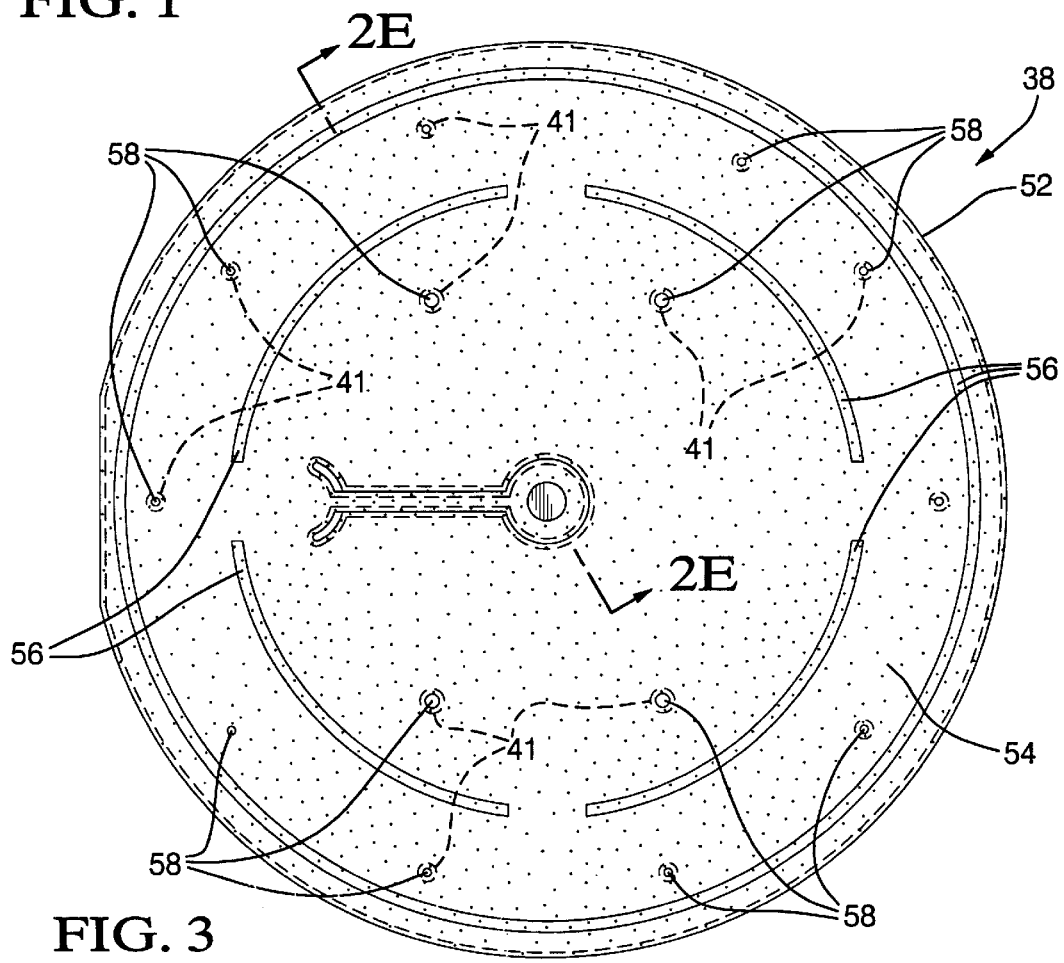
FIG. 3 is a plan view of an electrostatic chuck according to the present invention.
Figure 2A:
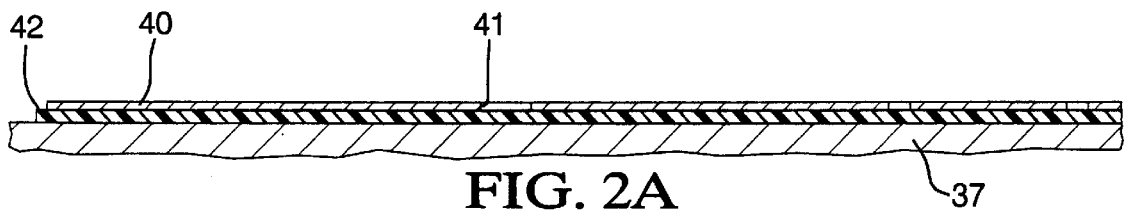
FIGS. 2A–2D are sectional views illustrating a process of making an electrostatic chuck according to the present invention.
Figure 2B:
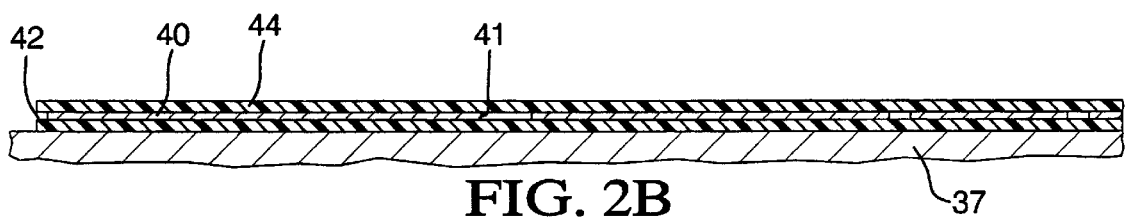
Figure 2C:
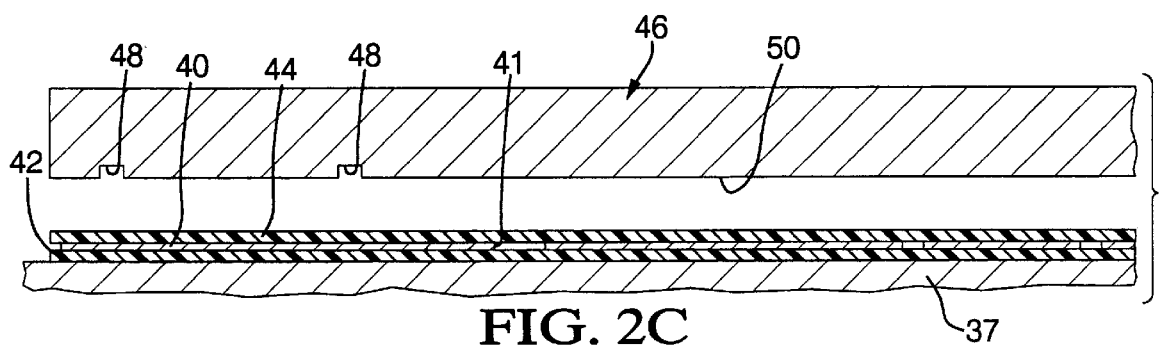
Figure 2D:
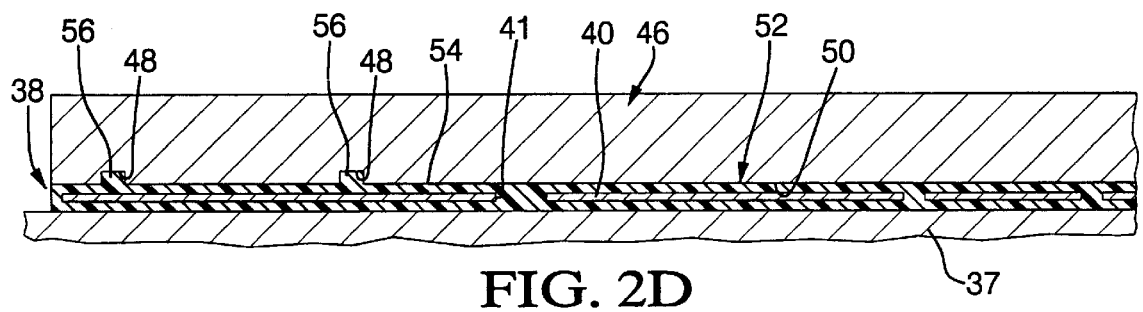
Figure 2E:
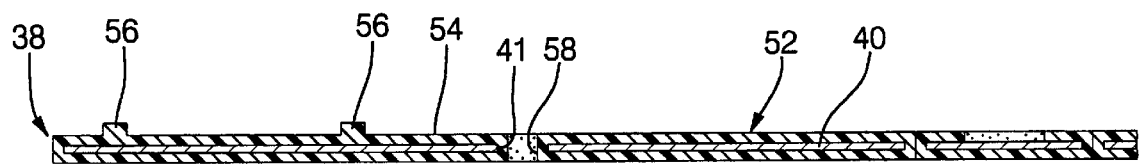
FIG. 2E is a sectional view taken along line 2E of FIG. 3.

FIG. 3 illustrates the copper layer encapsulated with an insulator 52 with raised features 56. The insulator 52 is then blanked with holes 58 to accommodate the flow of heat transfer gas therethrough. The raised features 56 may form dams to slow and confine the flow of heat transfer gas underneath the wafer. The dams may be a continuous annular structure or may be a series of arc-shaped dams with passageways defined therebetween for the flow of the heat exchange gas. The copper layer enclosed by the insulation 52 is then secured to a main body portion 36 of the electrostatic chuck which may be an aluminum substrate which again acts as the lower electrode. Preferably the main body portion 36 of the electrostatic chuck is an aluminum substrate approximately 1.0 inches thick. The raised feature 56 or dam helps to even the temperature gradient across the lower face of the semiconductor wafer 18 and also controls the gas leakage underneath the wafer. As such, the raised feature acts as a gasket under certain conditions.

What is claimed is:

1. A method of making an electrostatic chuck comprising:

providing a first insulative layer having a conductor layer thereon and a second insulative layer overlaying the conductor, laminating the first and second insulative layers and the conductor layer together using a mandrel having an engagement surface having grooves formed therein and the reverse image of raised dam features to be formed on the top surface of the second insulative layer for controlling the flow of heat exchange gas under a semiconductor wafer supported by the raised dam features formed in the second insulative layer; and forming raised dam features in a top surface of the second insulative layer while laminating the first and second insulative layer and the conductor layer together using the mandrel and heat.

2. A method of making an electrostatic chuck as set forth in claim 1 wherein said conductor layer comprises a copper foil.

3. A method of making an electrostatic chuck as set forth in claim 2 wherein said first and second insulative layers comprise a polyimide.

4. A method of making an electrostatic chuck as set forth in claim 1 including: supporting a bottom surface of the first insulative layer in a substantially flat plane while applying pressure to the second insulative layer through the mandrel and forming the raised dam features on the top surface of the second insulative layer.

5. A method of making an electrostatic chuck comprising:

providing a first insulative layer having a conductor layer thereon and a second insulative layer overlaying the conductor, laminating the first and second insulative layers and the conductor layer together using a mandrel having an engagement surface having grooves formed therein and the reverse image of raised dam features to be formed on the top surface of the second insulative layer for controlling the flow of heat exchange gas under a semiconductor wafer supported by the raised dam features formed in the second insulative layer; and forming raised dam features in a top surface of the second insulative layer while laminating the first and second insulative layers using the mandrel and heat, and supporting a bottom surface of the first insulative layer in a substantially flat plane while applying pressure to the second insulative layer through the mandrel and forming the raised dam features on the top surface of the second insulative layer, the raised dam features including a continuous dam feature that encircles most of the top surface of the second insulative layer.

\* \* \* \* \*